United States Patent [19]

Berg et al.

[11] 3,922,240

[45] Nov. 25, 1975

[54] PROCESS FOR THE PRODUCTION OF POURABLE, PULVERULENT RUBBER-FILLER MIXTURES

[75] Inventors: Gerhard Berg; Karl-Heinz Nordsiek; Egge Barnstedt, all of Marl, Germany

[73] Assignee: Chemische Werke Huels Aktiengesellschaft, Marl, Germany

[22] Filed: May 17, 1974

[21] Appl. No.: 471,161

[30] Foreign Application Priority Data

May 19, 1973 Germany............................ 2325550

[52] U.S. Cl. ........ 260/17 R; 252/528; 260/29.7 GP; 260/29.7 N; 260/29.7 EM; 260/29.7 T; 260/29.7 PT; 260/33.6 AQ; 260/34.2; 260/42.55; 260/42.57; 260/567.6 M
[51] Int. Cl.$^2$.... C08L 1/28; C08K 5/01; C08J 3/16; C08J 3/20
[58] Field of Search...... 260/17 R, 29.7 GP, 29.7 N, 260/29.7 EM, 29.7 T, 29.7 PT, 34.2, 567.6 M, 33.6 AQ, 42.55, 42.57; 252/528

[56] References Cited
UNITED STATES PATENTS
3,846,365  11/1974  Berg et al..................... 260/33.5 AQ OTHER PUBLICATIONS
Ott et al., High Polymers, (Vol. 5), Cellulose, (part 2), (Interscience), (N.Y.), (1954), p. 930.

Primary Examiner—Donald E. Czaja
Assistant Examiner—H. H. Fletcher
Attorney, Agent, or Firm—Millen, Raptes & White

[57] ABSTRACT

In a process for preparing discrete, finely divided, tack-free, pourable, powdery, filler-containing elastomer particles, optionally containing mineral oil plasticizer, by combining an aqueous suspension of a filler with a solution of elastomer dissolved in a volatile, inert organic solvent having a boiling point below 100°C, converting the unstable mixture thereby produced into a stable emulsion and precipitating and drying the mixture wherein a solid filler is suspended in water, a solution of elastomer, is introduced into this suspension with the formation of an unstable pseudo-emulsion, this unstable pseudo-emulsion is converted into a stable, aqueous emulsion by the addition of a combination of a quaternary ammonium salt surfactant with a non-ionic, water-soluble, protective colloid, while stirring, this stable emulsion is introduced into an aqueous alkali silicate solution containing 2–20 moles of $SiO_2$ per mole of said quaternary ammonium salt while maintaining said silicate solution at a pH of 7–14, and the filler containing elastomer is precipitated in a finely divided form with simultaneous removal by distillation of the elastomer solvent and is separated from water and dried.

17 Claims, No Drawings

PROCESS FOR THE PRODUCTION OF POURABLE, PULVERULENT RUBBER-FILLER MIXTURES

BACKGROUND OF THE INVENTION

This invention relates to the preparation of discrete, pourable, finely divided, tack-free filler-containing elastomer particles. More particularly, this invention relates to a simplified process for preparing such optionally plasticized elastomer particles with the aid of organic colloids in the elastomer precipitation step.

The processing of thermosetting elastomers into shaped objects is normally a multistage procedure. In contrast to the manufacture of molded components from thermoplastic synthetic resins, it is absolutely necessary, prior to the final shaping step, to conduct a generally complicated mixing process to obtain homogeneous incorporation of diverse additives prior to the cross-linking reaction. The high viscosity of the raw materials and their handling in bale form makes it necessary to utilize mixers, which perforce require a high energy consumption. The inherent considerable costs of such energy and equipment greatly impair the economy of the production of elastomeric materials.

Therefore, many efforts are now being directed toward adapting rubber technology to the principles of thermoplastic processing. An ideal starting point to attain this objective is rubbers in pulverulent form. Starting with the advantageous possibilities afforded in transportation and storage, the provision of automated feeding and conveying devices promises considerable savings in the feeding of mixing-and-deformation units. In order to incorporate additional ingredients, powder mixing plants can be utilized, which operate under very much more economical conditions. Thus, a continuous processing technique employing a high degree of automation has moved into the realm of possibility for the rubber industry.

In order to put the above-described ideas into practice, several methods which appeared suitable for the production of corresponding pulverulent rubber substances have been developed. Thus, German Unexamined Laid-Open Application DOS No. 2,135,266 and corresponding U.S. Pat. No. 3,846,365, the contents of which are incorporated by reference herein, disclose a process according to which discrete, finely divided, tack-free pourable elastomer particles are prepared from a filler-containing aqueous elastomer emulsion containing an aqueous emulsion of an elastomer dissolved in a volatile inert organic solvent having an emulsifying amount of quaternary ammonium salt cationic surfactant and an aqueous suspension or dispersion of a solid, finely divided elastomer filler, which process comprises gradually introducing the filler-containing aqueous elastomer emulsion into an aqueous alkali silicate solution while maintaining the solution at a pH of 7–14 and simultaneously evaporating the organic solvent to form discrete, finely divided, tack-free elastomer particles. The process can be applied to solid elastomers or to post-polymerization elastomer solutions, and is particularly suitable for preparing pourable carbon black-containing elastomer particles to be directly formed into shaped objects by molding, extrusion, etc.

It has furthermore been suggested in German Patent Application No. P 22 14 121.5 and corresponding U.S. Pat. application Ser. Number 343,433 filed Mar. 21, 1973, the contents of which are incorporated by reference herein, to produce pourable, pulverulent rubber mixtures by emulsifying rubber solutions, optionally containing mineral oil plasticizers in water in the presence of alkylamine oxyalkylates; introducing into these emulsions suspensions of solid fillers, preferably carbon blacks, optionally containing emulsifiers; continuously introducing the filler-containing, aqueous emulsions of the rubber solutions into hot aqueous alkali silicate solution, wherein the pH during the entire precipitation step ranges between 0.1 and 7, preferably between 1.0 and 3.5; simultaneously and continuously distilling off the rubber solvent; separating the thus-obtained, finely divided filler-containing rubber mixture from the water; and drying the product.

Another process for preparing pourable, fillercontaining elastomer particles is described in U.S. Pat. application Ser. No. 421,819 filed Dec. 5, 1973, the contents of which are also incorporated by reference herein, wherein an admixture of a rubber solution and filler is flashevaporated. As with the above and other processes, pourable, filler-containing elastomer particles amenable to thermoplastic processing techniques are obtained. Especially valuable elastomers for use in such processes are the stereo block homopolymers of butadiene prepared according to the adiabatic polymerization process with lithium catalysts according to the techniques of U.S. Pat. No. 3,829,409, the contents of which are also incorporated by reference herein.

The primary objective of these processes is to obtain pourable, pulverulent rubber-filler mixtures wherein the customary homogenization of rubbers with fillers during the course of the processing operation is entirely eliminated. The processing method was preferably a three-stage process. Thus, in the first stage, a rubber solution optionally containing plasticizer oil was emulsified in water in the presence of special cationic amine emulsifiers. In a second stage, dispersions or emulsions of fillers, optionally containing a plasticizer oil, were prepared. In a third stage, finally, both aqueous systems were mixed together and processed into pourable, pulverulent rubber-filler mixtures.

Inherent in these modes of operation are the relatively large amounts of water passing from the first two stages into the mixing stage and thus burdening the processing operation. These modes of operation lead perforce to relatively low solids contents, whereby the economy of the processes is impaired. Finally, only a small proportion of the water obtained during the processing step, as compared to the total quantity, could be recycled into the processes.

OBJECTS OF THE INVENTION

Accordingly, it is a general object of this invention to provide a process for circumventing the aforementioned disadvantages in a maximally simple and economical manner.

Another object of this invention is to provide a process for the preparation of pourable, pulverulent, optionally plasticized rubber-filler mixtures.

A further object of this invention is to provide a process for preparing discrete, finely divided, pourable and tack-free filler-container elastomer particles optionally containing mineral oil plasticizer which greatly reduces the volumes of water which are processed.

An additional object of this invention is to provide an improved process for preparing discrete, finely divided, tack-free and pourable elastomer particles containing a filler and mineral oil plasticizer.

Other objects and advantages of this invention will become apparent to those skilled in the art upon further study of the specification and appended claims.

SUMMARY OF THE INVENTION

Briefly, the above and other objects are attained in one aspect of this invention by providing, in a process for preparing discrete, finely divided, tack-free, pourable, powdery, filler-containing elastomer particles, optionally containing mineral oil plasticizer, by combining an aqueous suspension of a filler with a solution of elastomer dissolved in a volatile, inert organic solvent having a boiling point below 100°C, converting the unstable mixture thereby produced into a stable emulsion and precipitating and drying the mixture wherein a solid filler is suspended in water, a solution of elastomer is introduced into this suspension with the formation of an unstable pseudo-emulsion, this unstable pseudo-emulsion is converted into a stable, aqueous emulsion by the addition of a combination of a quaternary ammonium salt surfactant with a non-ionic, water-soluble, protective colloid, while stirring, this stable emulsion is introduced into an aqueous alkali silicate solution containing 2–20 moles of $SiO_2$ per mole of said quaternary ammonium salt while maintaining said silicate solution at a pH of 7–14, and the filler containing elastomer is precipitated in a finely divided form with simultaneous removal by distillation of the elastomer solvent and is separated from water and dried.

DETAILED DISCUSSION

It has now been found possible to obtain pourable, pulverulent rubber-filler mixtures optionally containing plasticizer oil by combining aqueous filler suspensions or emulsions with aqueous emulsions of rubber solutions, converting the resultant unstable admixture into a stable emulsion with the aid of certain protective colloids, precipitating and drying the mixtures employing the combination of features critical to the process as set forth herein.

It is thereby possible in an exceedingly simple manner to convert unstable pseudo-emulsions produced from water, fillers (optionally containing plasticizer oil) and rubber solutions (optionally containing plasticizer oil) for the first time in a single process stage into a stable, well transportable emulsion which can be processed or worked up directly. This conversion of the unstable pseudo-emulsion into a stable emulsion, connected with considerable technical advantages, is based on the combination, essential to the processing technology, of the quaternary ammonium salt surfactant with nonionic, water-soluble, high-molecular colloids, preferably with water-soluble cellulose derivatives. The effect of the combination according to this invention is completely surprising, insofar as it cannot be attained by either of the elements thereof used alone.

Preferred fillers within the scope of the process of this invention are the carbon blacks customary in the rubber industry, wherein carbon blacks of all activity stages can be utilized. Suitable carbon blacks include but are not limited to SAF (super abrasion furnace), ISAF (intermediate super abrasion furnace), HAF (high abrasion furnace), FEF (fast extruding furnace) and MT (medium thermal) carbon blacks. In place of or in addition thereto, light-colored fillers can also be used, e.g., highly active silicic acid, kaolin, ground slate, etc. The amount of carbon black to be employed is 1–500% by weight, preferably 40–150% by weight, based on the solid rubber. The amount of silicic acid to be employed is 1–400% by weight, preferably between 25 and 150% by weight, based on the solid rubber. Combinations of carbon black with light-colored fillers, preferably silicic acid, are also possible.

Suitable mineral oil plasticizers are the refinery products usually employed for this purpose which, depending on their application, can comprise chiefly or only aromatic, naphthenic, and/or paraffinic hydrocarbons. The amount of plasticizer oil to be used ranges between 1 and 100% by weight, preferably between 30 and 60% by weight, based on the filler.

The plasticizer oils can be introduced into the emulsion in several different ways. For example, the plasticizer oil can be introduced into the rubber solution before the preparation of the unstable pseudo-emulsion of water, filler and rubber solution. Alternatively, the plasticizer oil can be applied, e.g., under fluidization in a "Henschel" mixer, to the surface of the active filler, particularly an active carbon black. The powdery filler, laden with plasticizer oil, is then introduced into the process during the preparation of the unstable pseudo-emulsion of water and filler. Also, the plasticizer oil is dispersed in the stable, aqueous emulsion with the aid of a high-speed agitator. Other methods of introducing the plasticizer oil into the emulsion will occur to those skilled in the art.

It is possible by means of the present process to introduce into the emulsion not only fillers, such as carbon black or silicic acid in optimum dispersion and in almost any desired quantities, but also all rubber adjuvants required for vulcanization, e.g., antiaging substances, zinc oxide, stearic acid, sulfur and vulcanization accelerators.

The quaternary ammonium salt useful in this invention are cationic surface-active organic nitrogen compounds having a structure which includes a central nitrogen atom joined to four organic groups as well as to an acid radical, and include pentavalent ring compounds, e.g., laurylpyridium chloride. Preferred quaternary ammonium salts are those of the formula $(NR_1R_2R_3R_4)+X-$ wherein $R_1$, $R_2$, $R_3$ and $R_4$ are each aliphatic, particularly alkyl of 1–20 carbon atoms or araliphatic, particularly aralkyl of 6–20 carbon atoms, especially benzyl, and X is halogen, preferably chlorine or bromine, bisulfate or sulfate, e.g., lower alkyl sulfate. Especially preferred are compounds of the above formula wherein at least two of $R_1$, $R_2$, $R_3$ and $R_4$ are lower alkyl of 1–3 carbon atoms, particularly methyl or ethyl, and wherein one of $R_1$, $R_2$, $R_3$ and $R_4$ is an aliphatic hydrocarbon radical of 12–18 carbon atoms. Preferred pentavalent ring-containing quaternary ammonium salt emulsifiers are the N-substituted pyridine salts, especially those substituted on the nitrogen atom with an aliphatic hydrocarbon group of 12–18 carbon atoms, particularly alkyl.

Suitable quaternary ammonium salt emulsifiers include but are not limited to lauryldimethylbenzylammonium chloride, cetyltrimethylammonium bromide, lauryldimethylethylammonium ethyl sulfate, alkyl ($C_{12}$ to $C_{16}$)-trimethylammonium bromide, coconut dimethylbenzylammonium chloride, cetyldimethylbenzylammonium chloride, cetyldimethylethylammonium ethyl sulfate, distearyldimethylammonium chloride, as well as N-substituted salts of pyridine, e.g., laurylpyridinium chloride, cetylpyidinium bromide, tetradecylpyridinium bromide and laurylpyridinium bisulfate. Emulsifying amounts of these quaternary ammonium salts are suitably 0.01–2%, preferably 0.1–1%, based on the weight of the elastomer solution. The pH of the aqueous emulsion ranges between 0.1 and 7, preferably pH 3–7.

Especially advantageous as the nonionic, water-soluble, colloids are water-soluble, cellulose derivatives, e.g., methylcelluloses, hydroxyethylcelluloses, hydroxypropylmethylcelluloses, hydroxyethylmethylcelluloses and carboxymethylcelluloses. The cellulose derivates are utilized in amounts of 0.001–0.5% by weight, preferably 0.005–0.1% by weight based on the elastomer solution. These cellulose derivatives are soluble in the amounts employed.

The quantitative ratio of emulsifier to cellulose ranges between 3:1 and 120:1, preferably 4:1 to 30:1.

As the precipitants, aqueous alkali silicate solutions are utilized. Alkali silicate solutions are understood to mean sodium silicate solutions in molar ratios of $Na_2O$ to $SiO_2$ of 2:1 to 1:4. The amounts of $SiO_2$ required for the precipitation, contained in the alkali silicate solution, are 0.5–20 moles, preferably 1–8 moles, based on 1 mole of the quaternary ammonium salt.

Suitable for the process of this invention are all types of rubber soluble in organic solvents, including natural rubber.

Thus, polymers having solution viscosities ($\nu$) of between 1.0 dl./g. and 10 dl./g., preferably 2.0–3.5 dl./g., can be readily employed. The elastomer solutions are conventionally prepared, e.g., by solution polymerization in the presence of Ziegler catalysts, lithium-based catalysts (i.e., metallic lithium or organolithium compounds), Alfin catalysts, etc. with the use of volatile inert solvents, e.g., pentane, hexane and heptane. In this connection, those polymers are preferred which can be prepared in a volatile aliphatic solvent with boiling ranges of −5°C to +85°C and which can immediately be employed in the form obtained during the polymerization after a suitable working-up step. On the other hand, the rubber solutions can be produced by the redissolution of finished polymers, whereby also emulsion polymers can be made available for the process of this invention.

Within the scope of the process of this invention, those rubbers are preferred which are the polymers obtained by the polymerization of butadiene or the copolymerization of butadiene with styrene in the presence of lithium-based catalysts. This polymerization is effected in a conventional manner, e.g., described in U.S. Pat. No. 2,975,160, DAS 1,300,239 and DOS 1,495,655. The thus-obtained polymers have vinyl group proportions of 8-60%.

In accordance with an especially advantageous embodiment of the process of this invention, those rubbers are utilized which are produced by the adiabatic polymerization, i.e., a polymerization conducted at a rising temperature, of butadiene in the presence of a catalyst system comprising an organolithium compound and a Lewis base, which consist of polybutadiene having a vinyl group content of between 24 and 60%. Such a process is described in detail in the aforementioned U.S. Pat. No. 3,829,409.

Examples for suitable organolithium compounds are methyllithium, ethyllithium, n-, sec.-, tert.-butyllithium, amyllithium, phenyllithium, or cyclohexyllithium. The organolithium compounds are employed in catalytic amounts, generally of 0.01–0.1% by weight, preferably 0.02–0.05% by weight, based on the butadiene or the butadiene + styrene. Suitable Lewis bases include but are not limited to ethers, e.g., diethyl ether, di-n-propyl ether, diisopropyl ether, di-n-butyl ether, tetrahydrofuran, dioxane, ethylene glycol dimethyl ether, diethylene glycol dimethyl ether, diethylene glycol diethyl ether, triethylene glycol dimethyl ether, tetraethylene glycol dimethyl ether; tertiary amines, e.g., trimethylamine, triethylamine, N,N,N',N'-tetramethylethylenediamine, N-methylmorpholine, N-ethylmorpholine, N-phenylmorpholine, etc. The Lewis bases can be utilized in the pure form as well as in the form of mixtures. The catalyst-modifying amount of the Lewis bases is generally 0.01–10.0% by weight, preferably 0.05–5% by weight, based on butadiene and/or butadiene + styrene. The weight ratio of the Lewis base to the organolithium compound in the catalyst system is 0.1:1 to 1000:1, preferably 1:1 to 250:1.

The polymerization is effected in inert volatile organic diluents, e.g., iso- and n-butane, iso- and n-pentane, iso- and n-hexane, iso- and n-heptane, iso- and n-octane, cyclobutane, cyclopentane, cyclohexane, cycloheptane, cyclooctane or benzene, preferably in iso- and n-butane, iso- and n-pentane, iso- and n-hexane, iso- and n-heptane. The diluents are used either in the pure form or as mixtures.

Two temperature variables are characteristic for the adiabatic polymerization of 1,3-butadiene and/or of 1,3-butadiene and styrene under adiabatic conditions, i.e., the starting temperatures of 30°–110°C. at which the polymerization is initiated, and the temperatures of 155°–250°C at which the polymerization is terminated.

The rise in temperature occurring during the adiabatic polymerization is caused by the heat liberated during the polymerization of the butadiene and/or of the butadiene and styrene; the magnitude of this temperature increase depends on the specific heat of the diluent and the ratio of diluent to butadiene and/or to butadiene plus styrene.

In addition to homo-polybutadienes, copolymers are also suitable which consist of butadiene and, at most, 60% by weight of styrene and wherein 8–30% of the butadiene is bound in the 1,2-position.

Copolymerization is likewise conducted preferably adiabatically. In this procedure, block copolymers are produced consisting of butadiene and at most 60% by weight of styrene, wherein the polybutadiene contained therein has a vinyl group content of between 8 and 30%.

Also suitable for use in the present invention are random and block copolymers of butadiene and up to 40% by weight of styrene and wherein 8–30% of the butadiene is bound in the 1,2-position.

Suitable solvents for the conventional polymerization of butadiene and/or butadiene-styrene mixtures in solution are organic liquids, such as aliphatic, alicyclic and aromatic compounds having boiling points of between −5° and +85°C. Especially advantageous are organic liquids such as butane, pentane, hexane, octane, cyclohexane and butadiene.

Instead of the rubber solutions obtained by the polymerization of butadiene and/or butadiene-styrene mixtures in the presence of lithium catalysts, it is also possible to utilize rubber solutions obtained by the redissolution of suitable finished polymers.

The stable aqueous emulsions of fillers and rubber solutions according to the present invention are introduced into an aqueous precipitant bath at a temperature lying above the azeotropic boiling point of solvent and water, preferably 80°–90°C. The pH of the aqueous precipitant bath generally ranges between 7 and 14, preferably between 10 and 13.

Water is charged into an agitator-equipped vessel and the filler, preferably carbon black which contains optionally plasticizer oil, is introduced under agitation through a connecting pipe in the lid of the vessel. Thereafter, the filler is suspended and the rubber solution, which also optionally contains plasticizer oil, is admixed to the aqueous carbon black suspension. In this way, an unstable mixture is obtained which can be called a pseudo-emulsion. The pseudo-emulsion is distinguished from a true emulsion by the fact that a pseudo-emulsion is only stable while stirring; in other words after stopping stirring the pseudo-emulsion separates into its inherent different phases.

Through a pipe connection in the bottom of the vessel, an aqueous solution of the mixture of quaternary ammonium salts and water-soluble cellulose derivatives is introduced into the pseudo-emulsion. After the mixture has been added under agitation, a stable emulsion is produced within a few seconds from the unstable pseudo-emulsion; this stable emulsion is miscible with water in any proportion. The dispersion time ranges between 15 seconds and 15 minutes, preferably between 1 and 5 minutes. The emulsification is generally accomplished at temperatures of between 0° and 70°C, preferably at 15°–30°C. If desired, plasticizer oils or solid auxiliary agents required for the vulcanization, e.g., antiaging substances, zinc oxide, stearic acid, sulfur and vulcanization accelerators, can be introduced into the emulsion produced in this way from water, filler, and rubber solution. The stable aqueous emulsion of rubber solution and fillers, optionally containing all these rubber adjuvants, is continuously introduced into a precipitant bath comprising an aqueous alkali silicate solution. The precipitation and the removal of the solvent by distillation take place in one operating step, advantageously under agitation and under pressures of between 1 and 3 atmospheres absolute, and at temperatures which are always above the azeotropic boiling point of rubber solvent and water. During this process, the rubber-filler mixture, optionally containing plasticizer oil, is obtained in an extraordinarily finely particulate, nontacky form. After precipitation and removal of the rubber solvent, the precipitated rubber-filler mixture is freed of the main amount of water by filtration or decanting in accordance with conventional processes, e.g., on screens, rotary cellular filters, vacuum filters or centrifuges, and dried, preferably under constant movement, by conventional methods e.g. in belt dryers, drum dryers, plate dryers, fluidized-bed or spray-drying plants. During this step, pourable, pulverulent rubber-filler mixtures which optionally contain plasticizer oil are obtained as a product.

An interesting variant in the production of pulverulent rubber mixtures containing plasticizer oil is the addition of the plasticizer oil to the rubber-filler mixtures of this invention which are free of plasticizer oil in a powder mixer, for example of the "Henschel" type. Surprisingly, the dry consistency of the material, which imparts pourability, is retained during this step. Thereby, the possibilities for variation in the processing of pulverulent rubber-filler mixtures are still further increased. Further details of this method are disclosed in copending U.S. Patent application Ser. Number 468,699, filed May 10, 1974.

The pourable, pulverulent rubber-filler mixtures, which optionally contain plasticizer oil obtained according to the process of the present invention, especially the rubber-carbon black mixtures, are of great practical importance in the production of molded rubber articles of a great variety of types by the direct charging of the pulverulent, plasticizer-oil-containing mixtures in the extruder, in calendars, in transfer molding, as well as in automatic injection-molding machines. If auxiliary agents are to be admixed to these pulverulent rubber mixtures in the rubber processing plant, such mixing can be executed using maximally simple agitator systems, e.g., the "Loedige," "Papenmeier," or "Henschel" mixers. The pulverulent rubber mixtures which optionally contain various fillers and/or additives can now be utilized, in a surprisingly simple and economical manner, directly in the final stage of the usual rubber processing operation, i.e., in the molding or shaping process, while eliminating heretofore necessary heavy mechanical devices for the various mixing steps. The pulverulent, plasticizer-oil-containing rubber-filler mixtures are especially advantageous in the manufacture of tire treads. In this connection, the pulverulent mixtures of this invention offer advantageous conditions for the use of automatic conveying, metering and mixing devices, thus making it possible to change over from discontinuously operating large-scale plants to a continuous processing operation with reduced initial investment, energy, and personnel costs.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

17 kg. of ISAF carbon black (commercial name "Corax 6") is mixed into 200 kg. of water in a 600-liter agitator-equipped vessel, with the aid of a horseshoe agitator.

Agitator vanes are attached, oriented parallel to the ridges of the horseshoe, to achieve sufficient intermixing of carbon black and water. After the mixing step, a high-speed "Ultra-Turrax" agitator is operated in the same vessel for minutes at 750rpm, whereby a fine suspension of carbon black in water is produced. After the high-speed agitator has been turned off, 200 kg. of a 10% polybutadiene solution, produced by solution polymerization of butadiene with the aid of n-butyllithium as the catalyst, is mixed into this suspension with the aid of the horseshoe agitator. The polybutadiene has a vinyl group content of 35% and a solution viscosity of $\nu = 2.5$ dl./g. measured at 25°C as a 10% solution in 1,2,4-trichlorobenzene. After 10 minutes of agitation, 18 kg. of a 10% aqueous cetyltrimethylammonium chloride solution (commercial name "Dehyquart A") and 16 kg. of a 1% aqueous solution of methylcellulose (trade name "MC 20 000 S") are stirred into the homogeneous but unstable mixture. After the high-speed mixer has been turned on, the mixture is immediately converted into a stable emulsion. The pH of the emulsion ranges between 2.5 and 3.5. After the high-speed mixer has been turned off and the horseshoe mixer has been turned on, the stable emulsion is continuously pumped into an agitator-equipped vessel having a capacity of 2m³, filled with a precipitant comprising a mixture of 50 l. of water and 9.2 kg. of a 26% aqueous alkali silicate solution, heated to 80°–90°C. The pH of the precipitant is 11.8. The filler-containing elastomer mixture is immediately precipitated in an extremely finely divided form, while the rubber solvent is simultaneously distilled off. The fine-particulate precipitate is vacuum-filtered after the hexane has been exhausted completely and dried under vacuum at 75°C., thus obtaining a pourable, pulverulent elastomer-filler mixture.

The advance in the art recognizable from this example resides in the considerable simplification of the process operation, whereby a "one-stage process" is made possible.

EXAMPLE 2 (Comparative Example 1)

With the aid of the horseshoe agitator, 18 kg. of a 10% aqueous solution of cetyltrimethylammonium chloride is stirred into a mixture of water, carbon black and polybutadiene solution produced according to Example 1. After activating the high-speed agitator, the result is not a stable aqueous emulsion. The mixture remains unstable.

Consequently, according to this mode of operation, i.e., without the addition of the methylcelluloses to be used according to this invention, pulverulent filler-elastomer mixtures cannot be produced.

EXAMPLE 3 (Comparative Example 2)

With the aid of the horseshoe agitator, 160 kg. of an aqueous 1% solution of a methylcellulose (trade name "MC 20 000 S") is stirred into the mixture of water, carbon black, and polybutadiene solution produced according to Example 1. After the high-speed agitator has been put in operation, no stable aqueous emulsion is produced. The mixture remains unstable (see Example 2). As in Example 2, no pulverulent final products at all are formed in this procedure, showing that using the combination of quaternary ammonium salt surfactant and the protective colloid is critical.

EXAMPLE 4

With the use of high-speed agitator, 10 kg, of plasticizer oil with a high aromatic content (trade name "Naftolen MV") is dispersed within 3 minutes in the stable emulsion of water, ISAF carbon black and polybutadiene solution produced according to Example 1. The stable emulsion, containing plasticizer oil, is worked up in correspondence with Example 1, thus obtaining a pourable, pulverulent elastomer-fillerplasticizer oil mixture.

EXAMPLE 5

A "Henschel" mixer having a capacity of 30 l. and a wall temperature of 20°–50°C is filled with 3 kg. of HAF carbon black (trade name "Corax 9"). After the rotor is activated at a speed of 1,500 rpm, 1.76 kg. of plasticizer oil with high aromatic content (trade name "Naftolen MV"), preheated to 60°–80°C, is injected in finely divided form within 3 minutes through an inlet port provided with fine bores. After the plasticizer oil has been added, the rotor is allowed to run for another 2 minutes to complete the distribution. After a total mixing period of 5 minutes, the carbon black-plasticizer oil mixture is present in the dust-fine distribution characteristic of carbon black, without impairment of the free flow thereof and without any tendency toward caking. With the aid of the high-speed agitator, 27 kg. of this mixture is made into a slurry with 200 kg. of water. After the horseshoe mixer has been activated, 200 kg. of a 10% solution of a block copolymer of butadiene with 25% by weight of styrene, obtained by lithium polymerization and having a Mooney viscosity of 50, is added to the slurry. After 15 minutes, 18 kg. of a 10% aqueous solution of cetyltrimethylammonium chloride and 16 kg. of a 1% aqueous solution of hydroxypropylmethylcellulose (trade name "HPMC 20 000 PV") are introduced under agitation. After the high-speed agitator has been turned on, the mixture of carbon black dispersion and elastomer solution is converted into a stable emulsion. The emulsion is worked up according to Example 1, thus obtaining a pourable, pulverulent elastomer-plasticizer oil-filler mixture.

EXAMPLE 6

46.6 kg. of an FEF carbon black (trade name "Corax A") is stirred into 200 l. of water in a 600-liter agitator vessel of the type described in Example 1, with the aid of the horseshoe agitator, and then converted into a pasty, no longer pumpable suspension with the aid of the high-speed agitator. After the high-speed agitator has been turned off, 200 kg. of a 10% EPDM elastomer solution (trade name "BUNA AP 321") is mixed into this aqueous carbon black paste with the aid of the horse-shoe agitator. After 10 minutes, when a pseudo-homogeneous mixture is obtained, 20 kg. of a 10% aqueous cetyltrimethylammonium chloride solution and 20 kg. of a 1% aqueous solution of a methylcellulose (trade name "MC 20 000 S") are introduced under agitation. After the high-speed agitator has been turned on, the mixture is converted into a stable emulsion within 3 minutes. The product is worked up according to Example 1, thus obtaining a pourable, filler-containing powdery elastomer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing discrete, finely divided, tack-free, pourable, powdery, filler-containing elastomer particles from an admixture of (a) an aqueous elastomer emulsion comprising (i) a solution of vulcanizable elastomer dissolved in a volatile, inert organic solvent, (ii) an elastomer emulsifying amount of a quaternary ammonium salt cationic surfactant and (iii) water; and (b) an aqueous suspension or dispersion of a solid, finely divided elastomer filler, which process comprises gradually introducing said admixture into an aqueous alkali silicate solution containing 0.5–20 moles of $SiO_2$ per mole of said quaternary ammonium salt while maintaining said silicate solution at pH of 7–14 and simultaneously evaporating said volatile organic solvent to form said filler-containing elastomer particles, the improvement which comprises:

admixing (i) and (iii) with (b) to form an unstable pseudo-emulsion and converting the resultant pseudo-emulsion into a stable emulsion by admixing (ii) and a water soluble cellulose derivative protective colloid therewith.

2. A process according to claim 1, wherein the quaternary ammonium salt surfactant is a compound of the formula $(NR_1R_2R_3R_4)^+X^-$ wherein $R_1$, $R_2$, $R_3$ and $R_4$ are each alkyl of 1–20 carbon atoms or aralkyl of 6–20 carbon atoms and X is chlorine, bromine, sulfate or lower alkyl sulfate.

3. A process according to claim 1, wherein the protective colloid is a water-soluble cellulose derivative selected from the group consisting of methylcellulose, hydroxyethylcellulose, hydroxypropylmethylcellulose, hydroxyethylmethylcellulose and carboxymethylcellulose.

4. A process according to claim 2, wherein the quaternary ammonium salts are utilized in an amount of 0.01–2.0% by weight based on the elastomer solution.

5. A process according to claim 2, wherein the quaternary ammonium salt is selected from the group consisting of lauryldimethylbenzylammonium chloride, cetyltrimethylammonium bromide, lauryldimethylethylammonium ethyl sulfate, alkyl ($C_{12}$ to $C_{16}$)-trimethylammonium bromide, coconut-dimethylbenzylammonium chloride, cetyldimethylbenzylammonium chloride, cetyldimethylethylammonium ethyl sulfate and distearyldimethyl-ammonium chloride.

6. A process according to claim 3, wherein the water-soluble cellulose derivative is used in amounts of between 0.001 and 0.5% by weight based on the elastomer solution.

7. A process according to claim 1, wherein the elastomer is a polybutadiene having a vinyl group content of 8–60% obtained by lithium-based catalyst polymerization.

8. A process according to claim 7, wherein the polybutadiene is obtained by adiabatic polymerization and has a vinyl group content of 25–60%.

9. A process according to claim 1, wherein the elastomer is a copolymer of butadiene with up to 60% by weight of styrene produced in the presence of a lithium-based polymerization catalyst, wherein 8–30% of the butadiene is bound in the 1,2-position.

10. A process according to claim 9, wherein the copolymer is one obtained by adiabatic polymerization of butadiene and styrene.

11. A process according to claim 10, wherein the elastomer is a block copolymer of butadiene with up to 60% by weight of styrene.

12. A process according to claim 9, wherein the elastomer is a random copolymer of butadiene with up to 40% by weight of styrene.

13. A process according to claim 1, wherein the elastomer is an EPM or EPDM copolymer.

14. A process according to claim 1, wherein the pH of the stable filler-water-elastomer solution emulsion is 3–7.

15. A process according to claim 1, characterized in that the precipitant employed is an aqueous sodium silicate solution in molar ratios of $Na_2O:SiO_2$ of 2:1 to 1:4.

16. A process according to claim 1, further comprising adding vulcanization ingredients to the stable emulsion.

17. A process according to claim 1, further comprising adding a mineral oil plasticizer to the stable emulsion.

* * * * *